United States Patent
Benedetti (10) Patent No.: US 8,800,120 B2
(45) Date of Patent: Aug. 12, 2014

(54) HIGH RETENTION FASTENER

(75) Inventor: Steven M. Benedetti, Sterling Heights, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/458,043

(22) Filed: Apr. 27, 2012

(65) Prior Publication Data

US 2013/0287521 A1 Oct. 31, 2013

(51) Int. Cl.
 *B60R 13/02* (2006.01)
 *F16B 5/02* (2006.01)

(52) U.S. Cl.
 USPC ............ 24/458; 24/282; 24/293; 24/295

(58) Field of Classification Search
 CPC ....... B60R 13/0206; B60R 13/04; F16B 5/02; F16B 5/0208; F16B 21/075
 USPC ............ 24/289, 292, 293, 295, 297, 458
 See application file for complete search history.

(56) References Cited

U.S. PATENT DOCUMENTS

| | | | |
|---|---|---|---|
| 6,203,240 B1 * | 3/2001 | Hironaka et al. ............ 403/397 |
| 6,824,197 B2 | 11/2004 | Benedetti | |
| 6,857,168 B2 | 2/2005 | Lubera et al. | |
| 7,008,159 B2 | 3/2006 | Dendo | |
| 7,066,701 B2 | 6/2006 | Kovac | |
| 7,086,125 B2 | 8/2006 | Slobodecki et al. | |
| 7,134,170 B2 | 11/2006 | Gibbons et al. | |
| 7,168,138 B2 | 1/2007 | Lubera et al. | |
| 7,179,013 B2 | 2/2007 | Benedetti | |
| 7,179,038 B2 | 2/2007 | Reindl | |
| 7,213,304 B2 | 5/2007 | Lubera et al. | |
| 7,318,256 B2 | 1/2008 | Lubera et al. | |
| 7,320,157 B2 | 1/2008 | Lubera et al. | |
| 7,900,953 B2 | 3/2011 | Slobodecki et al. | |
| 7,963,487 B2 | 6/2011 | Saltenberger et al. | |
| 8,002,509 B2 | 8/2011 | Rosemann | |
| 8,038,167 B2 | 10/2011 | Slobodecki et al. | |
| 2004/0071527 A1 | 4/2004 | Dendo | |
| 2004/0093701 A1 * | 5/2004 | Dickinson et al. ........... 24/294 |
| 2005/0284989 A1 | 12/2005 | Mizukoshi | |
| 2006/0288543 A1 * | 12/2006 | Lubera et al. ............... 24/295 |
| 2007/0084024 A1 * | 4/2007 | Giugliano et al. ........... 24/293 |
| 2009/0060634 A1 | 3/2009 | Rosemann | |
| 2009/0205174 A1 | 8/2009 | Slobodecki et al. | |
| 2010/0026028 A1 * | 2/2010 | Smith et al. ................. 296/29 |
| 2011/0123294 A1 | 5/2011 | Kempf et al. | |
| 2011/0156377 A1 | 6/2011 | Slobodecki et al. | |
| 2011/0302746 A1 | 12/2011 | Sano | |
| 2012/0010638 A1 | 1/2012 | Wimmer et al. | |

* cited by examiner

*Primary Examiner* — Robert J Sandy
*Assistant Examiner* — David Upchurch
(74) *Attorney, Agent, or Firm* — Harness, Dickey & Pierce, P.L.C.

(57) ABSTRACT

A retention fastener includes a body panel and first and second leg members connected to the body panel by first leg member portions. Both leg members co-extend away from a body panel first panel face and have a second portion directed back toward the body panel. The first and second leg members include at least one retention feature connected to the second leg member portion, including: a single tooth wing having a smooth curved surface extending to a single wing retention tooth, and a multiple tooth wing positioned beside the single tooth wing. The multiple tooth wing has individual teeth on a curved surface sequentially increasing in height with respect to the curved surface. The multiple tooth wing is oriented in a superimposed position with respect to the single tooth wing so the individual teeth extend outwardly with respect to the smooth curved surface of the single tooth wing.

22 Claims, 8 Drawing Sheets

HIGH RETENTION FASTENER

FIELD

The present disclosure relates to high retention fasteners used to join components to an automobile vehicle body panel.

BACKGROUND

This section provides background information related to the present disclosure which is not necessarily prior art.

For automotive applications, fasteners are used to join trim or panel members to sections or metal body portions of the automobile. The requirements for these fasteners are that they be inserted into apertures of the automobile and meet requirements to both retain a component as well as provide a minimum pullout retention force such that the component is retained under given load conditions but can be removed without damaging the component. Common fastener designs include directly opposed flexible wings which deflect inwardly upon insertion of the fastener and expand by spring force to hold the fastener within an aperture such as a slot in the automobile.

Drawbacks of commonly used fasteners occur for certain applications, including the inability to accommodate multiple panel thicknesses with the same fastener, and for fasteners used to mount trim or instrument panels where it is desirable to provide a minimum height for the fastener portion extending away from the panel where the component is to be mounted. Fasteners commonly used in these applications have standoff dimensions that can interfere with flush mounting the component, thereby requiring modification of the trim component.

SUMMARY

This section provides a general summary of the disclosure, and is not a comprehensive disclosure of its full scope or all of its features.

According to several aspects of the present disclosure, a retention fastener includes a body panel and first and second leg members integrally connected to the body panel and both co-extending with respect to a first panel face of the body panel. Each of the first and second leg members includes at least one retention feature having a single tooth wing having a smooth curved surface extending to a single wing retention tooth, and a multiple tooth wing positioned beside the single tooth wing. The multiple tooth wing has multiple individual teeth arranged on a curved surface. The multiple tooth wing is in a superimposed position with respect to the single tooth wing such that the individual teeth extend outwardly with respect to the smooth curved surface of the single tooth wing.

According to other aspects, a retention fastener includes a body panel and first and second leg members integrally connected to the body panel by first leg member portions. Both first and second leg members co-extend with respect to a first panel face of the body panel and have a second leg member portion directed back toward the body panel. Each of the first and second leg members include at least one retention feature connected to the second leg member portion, having: a single tooth wing having a smooth curved surface extending to a single wing retention tooth, and a multiple tooth wing positioned beside the single tooth wing. The multiple tooth wing has multiple individual teeth arranged on a curved surface sequentially increasing in height with respect to the curved surface. The multiple tooth wing is oriented in a superimposed position with respect to the single tooth wing such that the individual teeth extend outwardly with respect to the smooth curved surface of the single tooth wing.

According to still further aspects, a retention fastener system includes a panel having an aperture created therethrough and opposed first and second panel surfaces, and a fastener adapted to partially extend through the aperture of the panel. The fastener includes a body panel contacting the first panel surface in a fastener installed position and first and second leg members integrally connected to the body panel by first leg member portions and both co-extending with respect to a first panel face of the body panel and having a second leg member portion directed back toward the body panel. Each of the first and second leg members include at least one retention feature connected to the second leg member portion. The at least one retention feature includes: a single tooth wing having a smooth curved surface extending to a single wing retention tooth, and a multiple tooth wing positioned beside the single tooth wing. The multiple tooth wing has multiple individual teeth arranged on a curved surface sequentially increasing in height with respect to the curved surface. The multiple tooth wing is oriented in a superimposed position with respect to the single tooth wing such that the individual teeth extend outwardly with respect to the smooth curved surface of the single tooth wing. The first and second leg members extend through the aperture in the fastener installed position and have an individual one of the individual teeth of the multiple tooth wing and the smooth curved surface of the single tooth wing of both the first and second leg members contacting the second panel surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figures 1, 2:
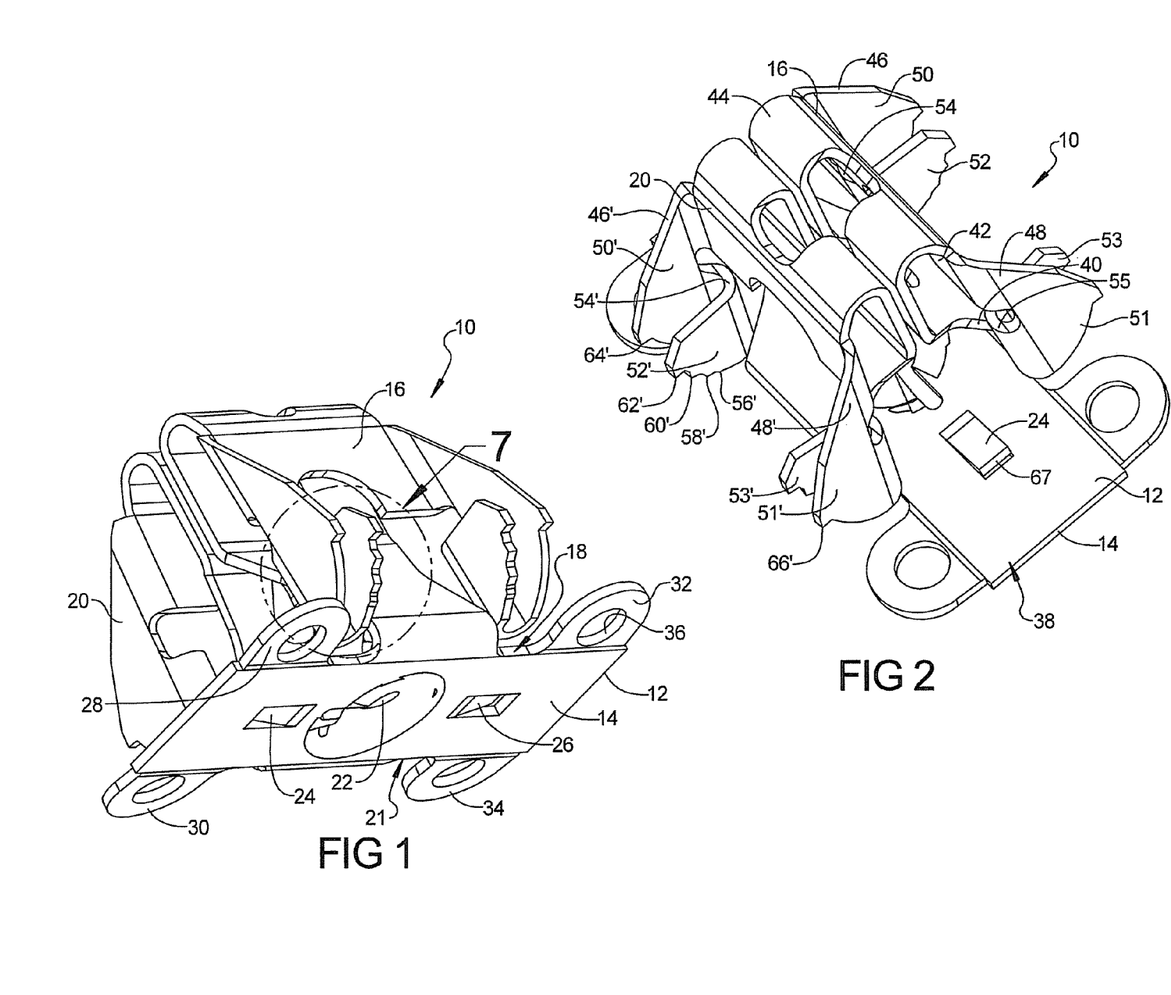
FIG. 1 is a bottom front perspective view of a high retention fastener of the present disclosure.
FIG. 2 is a top end perspective view of the fastener of FIG. 1.

Referring to FIG. 1, a high retention fastener 10, according to several aspects of the present disclosure, includes a fastener body 12 made for example from a metal, such as a spring steel, coated with a material, such as a zinc coating, to provide for corrosion resistance. Fastener body 12 includes a planar shaped body panel 14 from which a first leg member 16 integrally extends from a first panel edge 18 of planar body panel 14 and a second leg member 20 integrally extends from a second panel edge 21 oppositely directed with respect to first panel edge 18.

Planar body panel 14 further includes a single helix aperture 22 and each of a first bite member 24 and a second bite member 26 oppositely positioned with respect to single helix aperture 22. In addition, each of a first, second, third, and fourth eyelet 28, 30, 32, 34 integrally extend from either the first or second panel edges 18, 21. The purpose of the first, second, third, fourth eyelets 28, 30, 32, 34 will be described in greater detail in reference to FIGS. 5 and 12. Each of the eyelets 28, 30, 32, 34 includes an eyelet aperture 36 which are all sized to remove a predetermined amount of material of the eyelets 28, 30, 32, 34 to either increase or decrease a bending stiffness of the individual eyelets 28, 30, 32, 34.

Referring to FIG. 2 and again to FIG. 1, both the first and second leg members 16, 20 extend away from a first panel face 38 of planar body panel 14. The first and second leg members 16, 20 define mirror images of each other. Each of the first and second leg members 16, 20 includes a first leg member portion 40, a second leg member portion 42 positioned outward of first leg member portion 40, and a U-shaped leg member portion 44 which integrally connects the first and second leg member portions 40, 42. Each of the first and second leg members 16, 20 also includes multiple retention features, including a first retention feature 46 and a second retention feature 48, which are mirror images of each other. First retention feature 46 includes a single tooth first wing 50, and second retention feature 48 includes a single tooth second wing 51. In addition, first retention feature 46 further includes a multiple tooth first wing 52, and second retention feature 48 includes a multiple tooth second wing 53. A curved wing connecting first member 54 integrally connects single tooth first wing 50 to multiple tooth first wing 52. Similarly, a curved wing connecting second member 55 integrally connects single tooth second wing 51 to multiple tooth second wing 53.

Each of the multiple tooth first and second wings 52, 53 (or 52', 53') include a plurality of individual teeth each having a successively greater height determined with respect to a curved surface of the first and/or second wings ranging between a lowest height first tooth 56, a second tooth 58 positioned proximate to first tooth 56, a third tooth 60 positioned proximate to second tooth 58, and a highest fourth tooth 62 positioned proximate to third tooth 60. Each of the single tooth first wing 50 and single tooth second wing 51 also include a retention tooth which is positioned generally in alignment with respect to fourth tooth 62. In the embodiment shown, a first wing retention tooth 64 is provided with single tooth first wing 50, and a second wing retention tooth 66 is provided with single tooth second wing 51. Each of the first and second bite members 24, 26 (second bite member 26 is not clearly visible in this view) are created such as by a lancing or piercing operation such that the bite members 24, 26 are integrally connected to planar body panel 14 at a first end, and each includes a free end 67 raised from planar body panel 14 with respect to first panel face 38.

Figure 11:
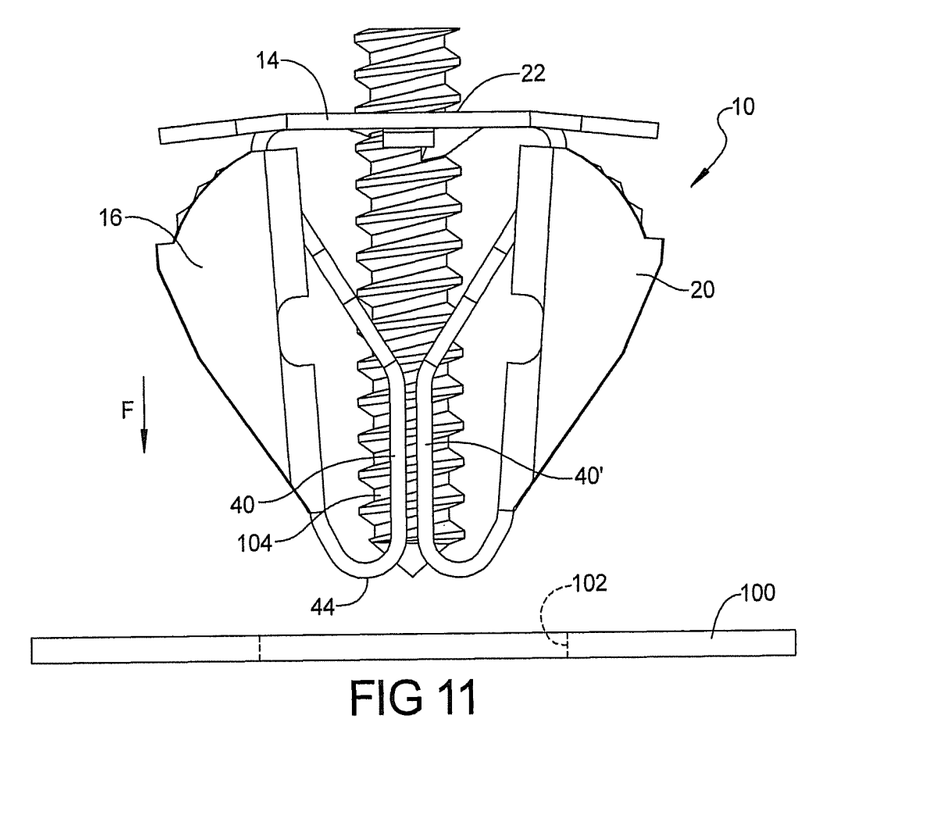
FIG. 11 is an end elevational view of the fastener of FIG. 1 shown prior to insertion into a aperture of a vehicle body panel.

Referring to FIG. 3 and again to FIGS. 1 and 2, first leg member 16 includes an opening 68 and second leg member 20 includes an oppositely directed opening 70 which are aligned with single helix aperture 22. A threaded fastener (shown and described in greater detail in reference to FIGS. 11 and 12), received through single helix aperture 22 can extend entirely between first and second leg members 16, 20 without contacting either of the leg members because of the clearance provided by openings 68, 70. Opening 68 further divides U-shaped leg member portion 44 into a portion 44a and a second portion 44b. U-shaped leg member portion 44' is similarly divided by opening 70. The eyelet aperture 36 for each of the first, second, third, and fourth eyelets 28, 30, 32, 34, such as for fourth eyelet 34 shown, can be varied to change a flange segment width "W" by increasing or decreasing an eyelet aperture diameter "D". By changing the flange segment width "W", the stiffness and therefore the resistance to elastic bending provided by each of the eyelets 28, 30, 32, 34 can be predetermined or tuned.

Figure 4:
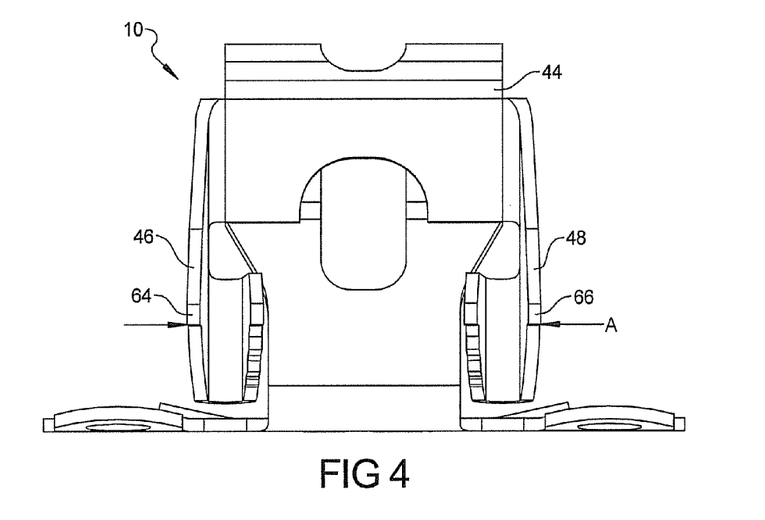
FIG. 4 is a front elevational view of the fastener of FIG. 1.
Figure 10:
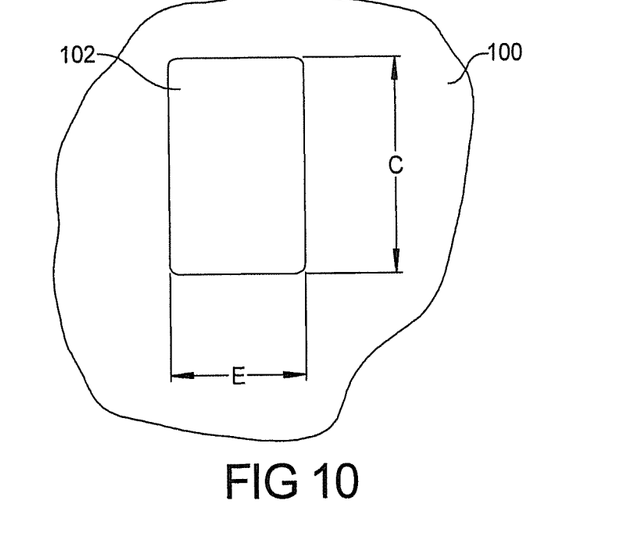
FIG. 10 is a top plan view of an aperture created in a panel adapted to receive the fastener of FIG. 1.

Referring to FIG. 4 and again to FIGS. 1 and 2, a wing-to-wing span "A" of each of the first and second retention features 46, 48 is greatest proximate to the first and second wing retention teeth 64, 66. The wing-to-wing span "A" decreases progressively as the first and second retention features 46, 48 approach the U-shaped leg member portions 44. This helps to ensure a centering alignment of fastener 10 when fastener 10 is inserted into a body panel aperture, to be described in greater detail in reference to FIGS. 10 through 12.

Referring to FIG. 5 and again to FIGS. 1 and 2, a leg spacing "B" is initially provided between first leg member portions 40, 40' of first and second leg members 16, 20. During installation of the first and second leg members 16, 20 into a body panel first and second leg members 16, 20 may contact each other thereby reducing the leg spacing "B" to zero, which thereafter forces further deflection of the free ends of first and second leg members 16, 20 toward each other. A smooth curved surface 72, 72' is provided with each of the single tooth wings such as single tooth second wings 51, 51' shown. The single tooth wings 50, 51 (50', 51') are superimposed with respect to the multiple tooth wings 52, 53 (52', 53') when viewed as shown in FIG. 5, and individual teeth of the multiple tooth second wings, such as multiple tooth second wing 53' (not clearly visible in this view), are oriented in a superimposed position and extend further outward with respect to smooth curved surface 72, 72' such that the height of each successive one of the first, second, third, and fourth teeth 56, 58, 60, 62 extends further outward and away with respect to smooth curved surface 72, 72'.

Each of the first and second leg members 16, 20 further includes a first taper surface 73 for each of the single tooth second wings such as shown for single tooth second wing 51. The first taper surface 73 intersects a second taper surface 74 which subsequently intersects a third taper surface 76 proximate to the second wing retention tooth 66. In the non-deflected condition of first and second leg members 16, 20 shown, a positive engagement surface 78 of each of the second wing retention teeth 66, 66' is oriented substantially parallel with respect to planar body panel 14. A leg member free end 79, 79' of the first and second leg members 16, 20 is positioned proximate to planar body panel 14 and is oppositely directed with respect to U-shaped leg member portions 44, 44' toward planar body panel 14. From the non-deflected condition shown, the leg member free ends 79, 79' are elastically deflectable toward each other during installation of fastener 10 by rotation that occurs as a result of bending at the U-shaped leg member portions 44, 44'.

Figure 3:
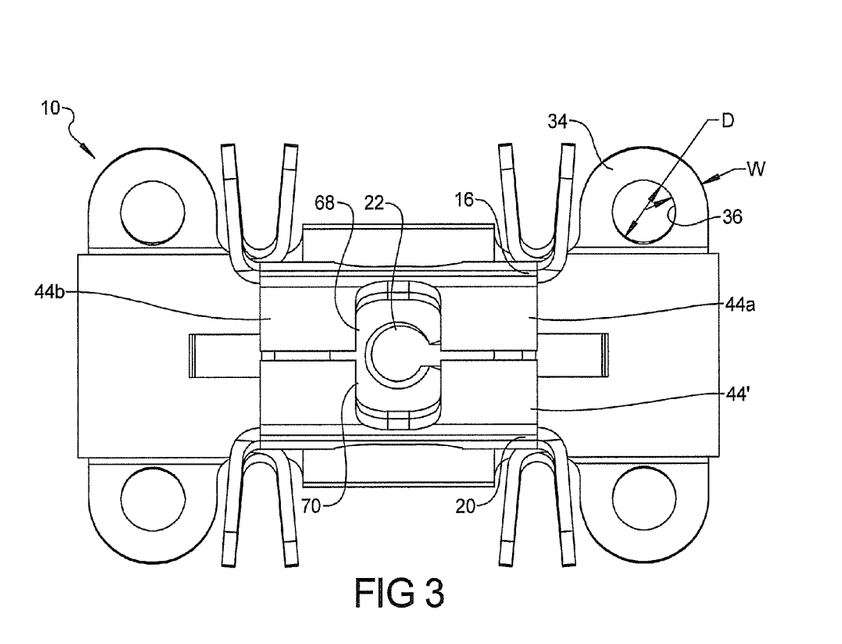
FIG. 3 is a top plan view of the fastener of FIG. 1.
Figure 5:
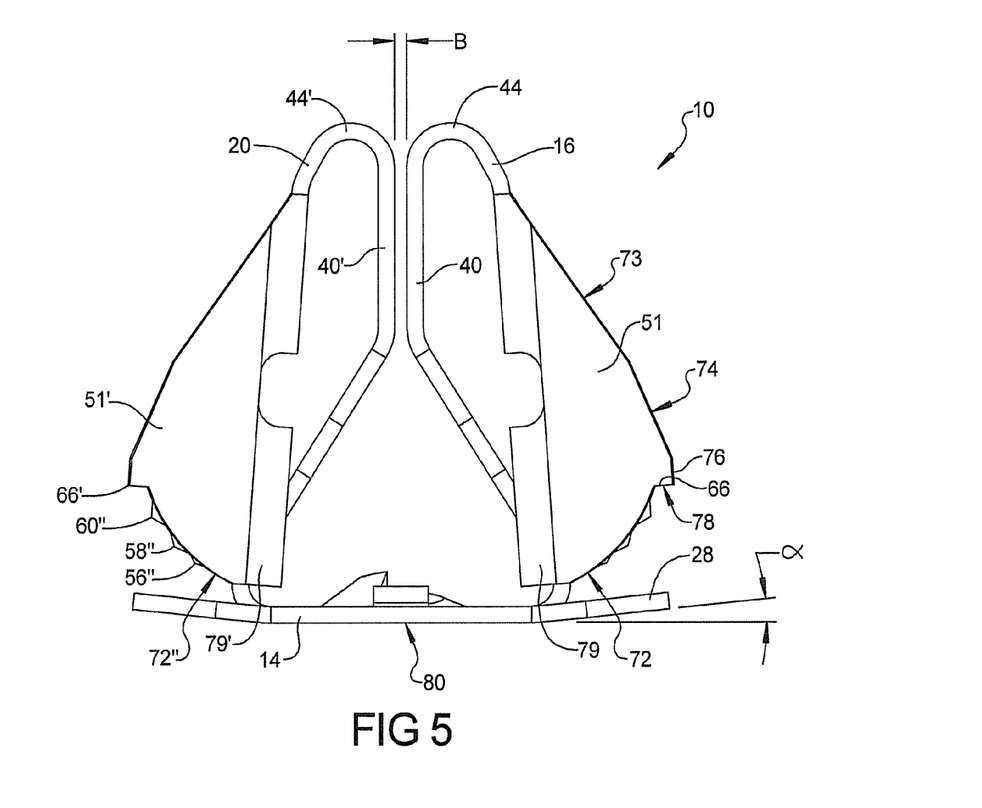
FIG. 5 is an end elevational view of the fastener of FIG. 1.

With further reference to FIG. 5, each of the first, second, third, and fourth eyelets 28, 30, 32, 34 are oriented at an angle $\alpha$ with respect to a second panel face 80 of planar body panel 14. According to several aspects of the present disclosure, angle α can range from approximately 5 to 15 degrees or more. The orientation of eyelets 28, 30, 32, 34 at angle α predisposes the eyelets 28, 30, 32, 34 for subsequent elastic deflection when the eyelets 28, 30, 32, 34 contact a panel, shown and described in greater detail in reference to FIGS. 11 and 12. With continuing reference to FIGS. 5 and 3, by initially changing angle α and flange segment width "W" of the eyelets, the amount each eyelet 28, 30, 32, 34 will elastically deflect can be tuned to a greater or lesser degree, depending upon the amount of force applied during installation of fastener 10 as the eyelets 28, 30, 32, 34 contact the body panel. For example, by minimizing angle α and maximizing eyelet aperture diameter "D", the resistance to bending of the eyelets 28, 30, 32, 34 is minimized, or by maximizing angle α and minimizing eyelet aperture diameter "D", the resistance to bending of each of the eyelets is maximized. The geometry of the individual eyelets 28, 30, 32, 34 can therefore be adjusted tuned at the time the tooling for fastener 10 is created to provide for the greatest range of flexibility of the first, second, third, fourth eyelets 28, 30, 32, 34.

Figure 6:
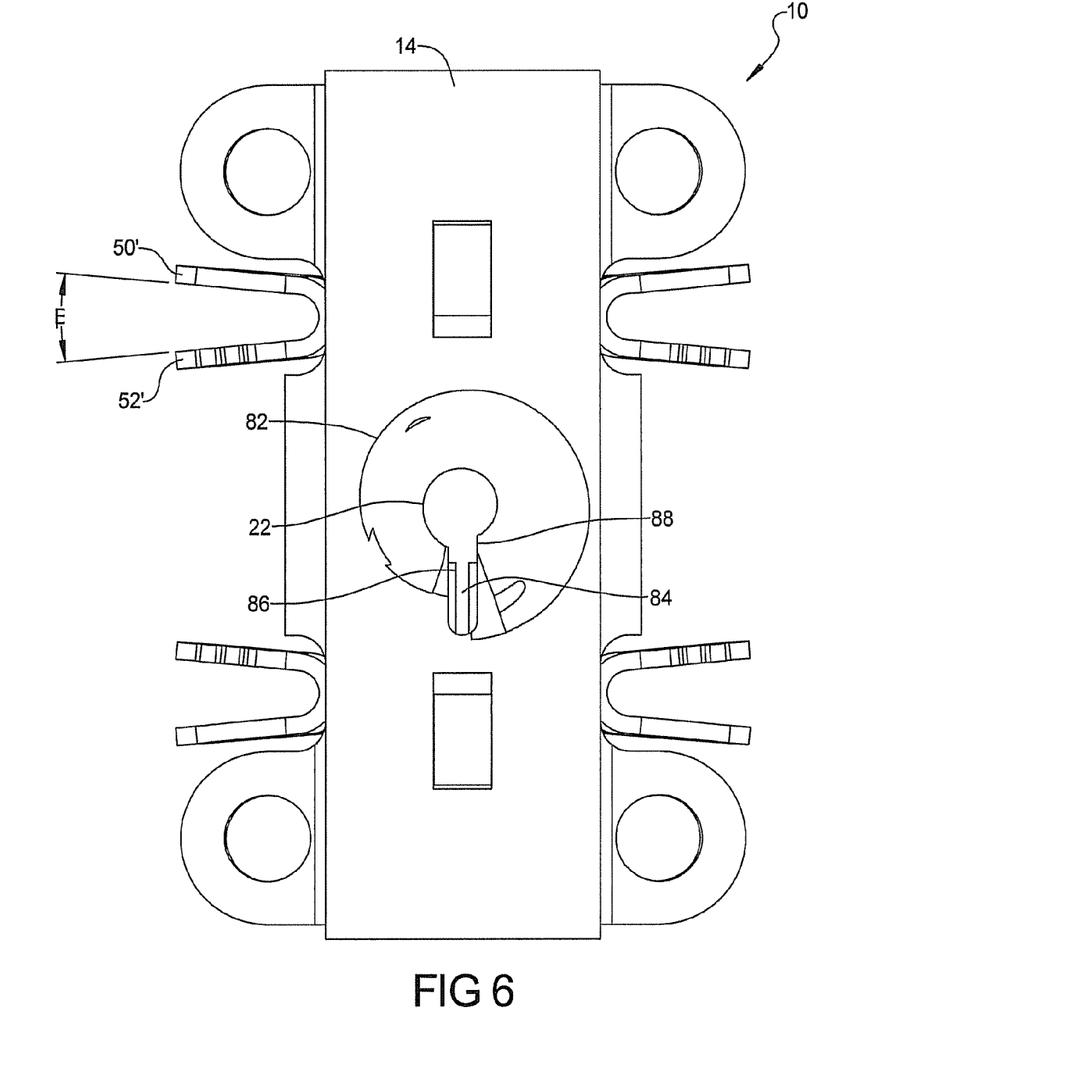
FIG. 6 is a bottom plan view of the fastener of FIG. 1.

Referring to FIG. 6 and again to FIGS. 1 and 2, single helix aperture 22 can be formed with single helix aperture 22 substantially centered in planar body panel 14 such that a concave depression 82 and an elongated slot 84 are created. Elongated slot 84 defines a thread lead engagement edge 86 to receive a threaded fastener shown and described in greater detail in reference to FIG. 12. A raised end portion 88 of single helix aperture 22 is raised with respect to thread lead engagement edge 86. The individual single and multiple tooth wings, such as single tooth first wing 50' and multiple tooth first wing 52' as shown, can be oriented such that a wing-to-wing orientation angle β is created. According to several aspects, wing-to-wing orientation angle β can range between zero (parallel alignment) to approximately 20 degrees. Wing-to-wing orientation angle β helps to center fastener 10 in a body panel aperture.

Referring to FIG. 7 and again to FIG. 2, as previously noted, the individual teeth of the multiple tooth wings, such as multiple tooth second wing 53', increase in height successively between first tooth 56' and fourth tooth 62'. The smooth curved surface 72 of each of the single tooth wings, such as single tooth second wing 51', are defined by a curved surface radius 90.

Figure 7:
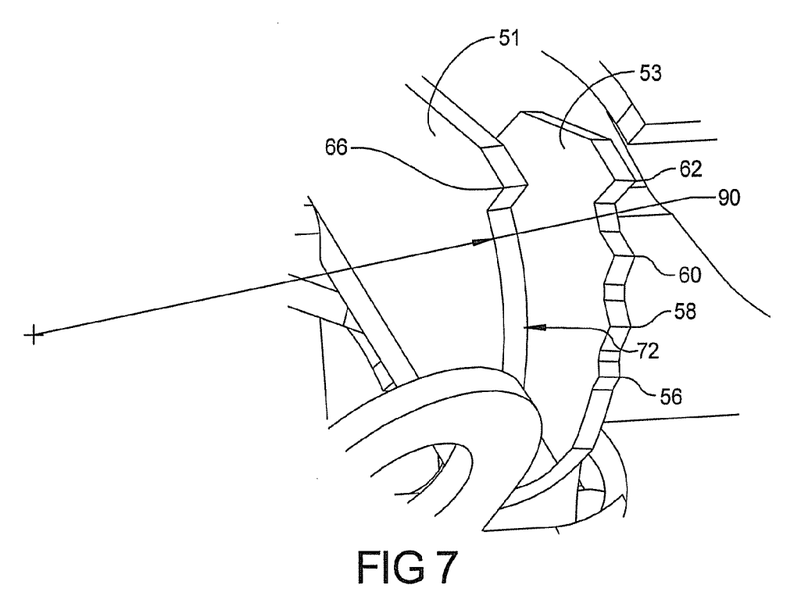
FIG. 7 is an end perspective view of area 7 of FIG. 2.
Figure 8:
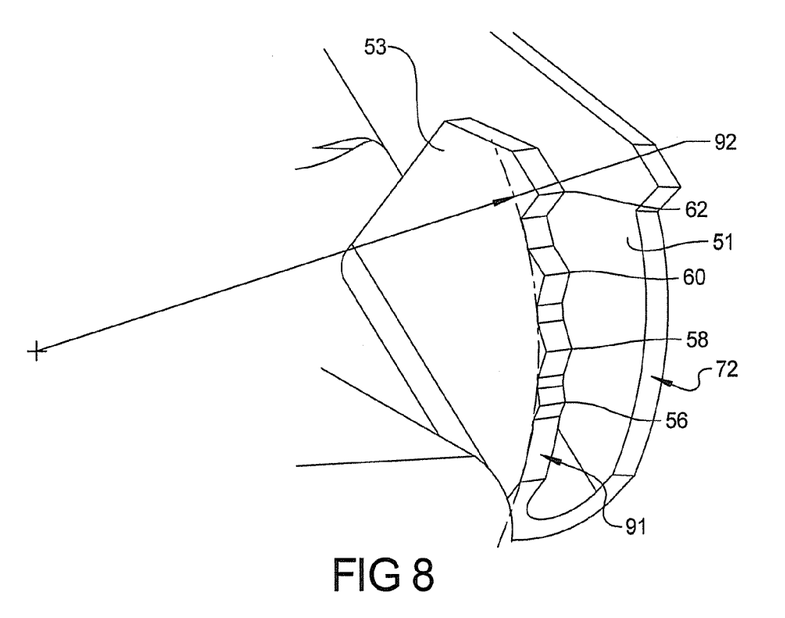
FIG. 8 is a reversed end perspective view of FIG. 7.

Referring to FIG. 8 and again to FIG. 7, each of the first through fourth teeth 56, 58, 60, 62 extend away from a curved surface 91 of the multiple tooth wings, such as multiple tooth second wing 53'. Curved surface 91 is defined with respect to a curved surface radius 92 which is substantially equal to curved surface radius 90.

Figure 9:
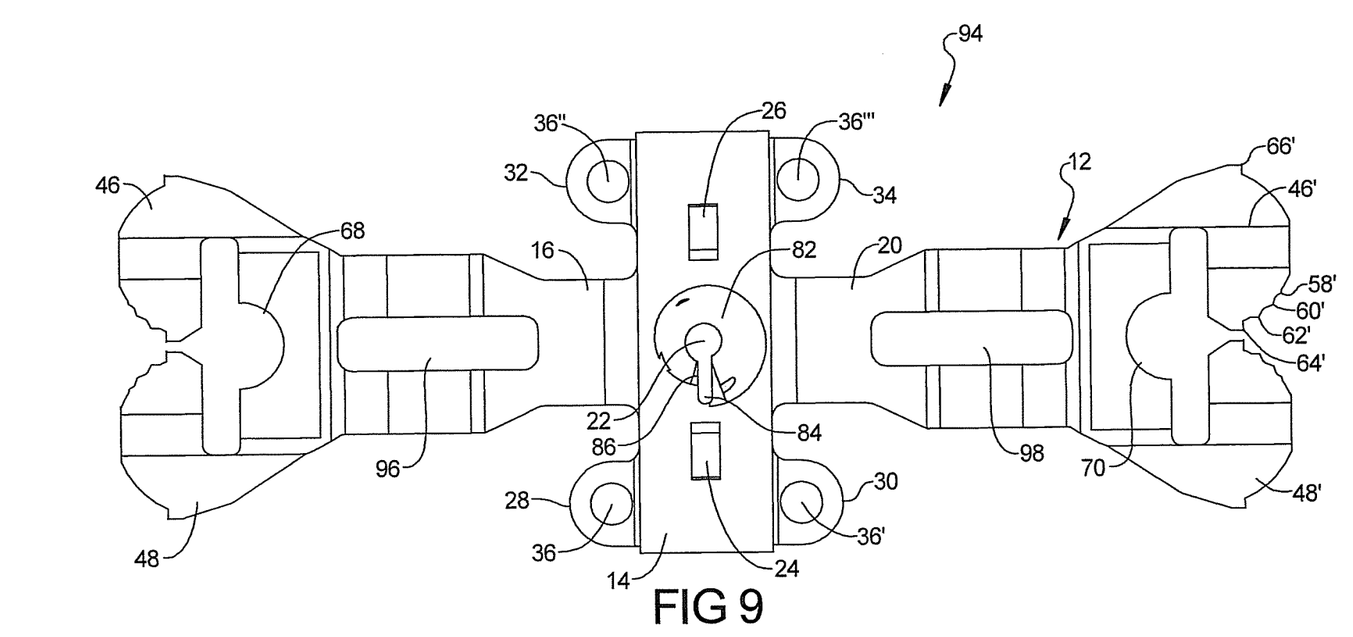
FIG. 9 is a top plan view of a stamped blank for the fastener of FIG. 1 prior to bending.

Referring to FIG. 9, a fastener blank 94 is created by any combination of a punching, piercing, and/or stamping operation and is shown prior to bending to provide the geometry of finished fastener 10. Fastener blank 94 provides first and second retention features 46, 48 at opposite ends with respect to first and second retention features 46', 48'. In addition to opening 68, first leg member 16 also includes a first leg elongated slot 96 which can be sized to increase or decrease the stiffness of first leg member 16. Similarly, a second leg elongated slot 98 is provided with second leg member 20 for a similar purpose. Each of the features of fastener 10 are provided with fastener blank 94, including the individual first, second, third, fourth eyelets 28, 30, 32, 34 plus first and second bite members 24, 26. Each of the first, second, third, fourth teeth 56, 58, 60, 62, 64, 66 are also created at this time. A coating of a corrosion-resistant material, such as a zinc coating, can be applied to the material of fastener blank 94 either before or after the operations to create the individual features of fastener blank 94. Other non-corrosive materials can also be substituted for zinc.

Referring to FIG. 10 and again to FIGS. 1-9, fastener 10 is sized to allow the first and second leg members 16, 20 to elastically deflect toward each other such that the planar body panel 14 of fastener body 12 can be brought into direct contact with a panel 100, such as a vehicle body panel, by inserting the first and second leg members 16, 20 through an aperture 102 created in panel 100. According to several aspects, aperture 102 has a rectangular shape and includes an aperture length "C" which is greater than an aperture width "E". According to a first non-limiting example, aperture length "C" can be 20.0 millimeters, and aperture width "E" can be 12.8 millimeters. These dimensions coincide with common rectangular-shaped aperture openings used in the automotive industry for receipt of fasteners, such as fastener 10.

Referring to FIG. 11 and again to FIGS. 1-10, fastener 10 is shown immediately prior to installation in the aperture 102 of panel 100. A device, shown and described in better detail in reference to FIG. 12, can be connected to fastener 10 via a shank 104 threadably received in single helix aperture 22 prior to or after installation of fastener 10. It is noted that shank 104 does not contact either the first or second leg member 16, 20 at any position of its installation; therefore, first leg member portions 40, 40' can contact each other during installation of fastener 10 without interference with shank 104. Fastener 10 is oriented having U-shaped leg member portions 44, 44' directed toward panel 100 such that U-shaped leg member portions 44, 44' initially enter aperture 102 first. The first and second leg members 16, 20 subsequently deflect toward each other as they contact an inner wall of aperture 102, until planar body panel 14 contacts panel 100.

Referring to FIG. 12 and again to FIGS. 1-11, fastener 10 is inserted through aperture 102 until planar body panel 14 contacts a first panel surface 106 of panel 100. The height of each of the successive teeth from first through fourth tooth 56 to 62 sequentially increases to permit a maximum rotation of the first and second leg members 16, 20 about an arc of rotation "J" (shown with respect to second leg member 20 or oppositely with respect to first leg member 16) so the minimum number of teeth contact the second panel surface 108 thereby allowing maximum elastic return rotation to a maximum rotated position. The maximum rotated position of first and second leg members 16, 20 after insertion into aperture 102 depends on a panel thickness "G" of panel 100. Panel 100 can be provided in multiple thicknesses, as is known, which range from a minimum thickness shown of approximately 0.65 millimeters to a maximum panel thickness of a panel 100a of approximately 2.5 millimeters. In the installed position, individual ones of the first through fourth teeth 56, 58, 60, 62 contact a second panel surface such as a second panel surface 108 of the minimum thickness panel 100, or a second panel surface 108a of maximum thickness panel 100a. A fastener extending length "H" can therefore vary depending upon the thickness of panel 100.

Figure 12:
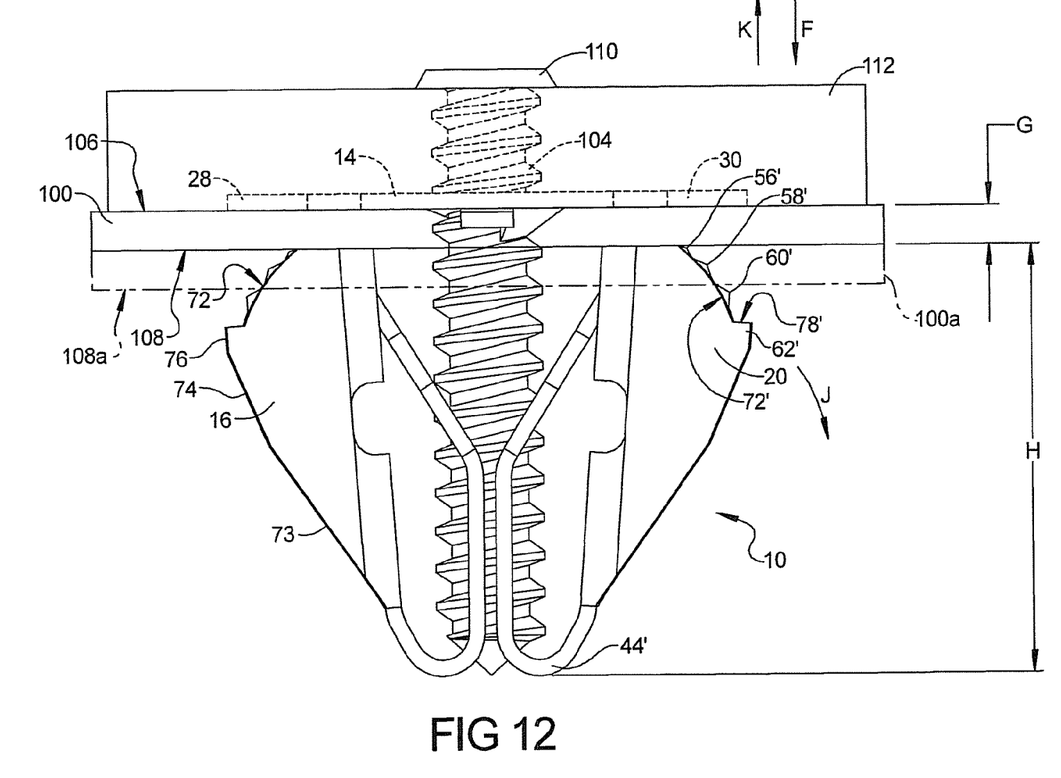
FIG. 12 is an end elevational view of the fastener of FIG. 1 shown in an installed condition in a vehicle body panel.

The teeth which contact the second panel surface 108 of panel 100 act to resist release of fastener 10 in a release direction "K". The orientation provided for positive engagement surface 78 of the single tooth wings 50, 51 and a similar surface of the multiple tooth wings 52, 53, due to their orientation at substantially a parallel orientation with respect to second panel surface 108, provide a maximum resistance against release of fastener 10 in the release direction "K". According to several aspects of the present disclosure, fastener 10 can be inserted with as little as 45 newton meters of force. A maximum resistance to release of fastener 10 of approximately 1,780 newton meters is provided by contact between positive engagement surface 78 to second panel surface 108.

With continuing reference to FIG. 12, a connection fastener head 110, integrally connected to shank 104, provides a positive engagement feature to retain a mounted device 112 with respect to first panel surface 106. Mounted device 112 can include a plurality of different devices including but not limited to vehicle trim members, manual hand grabs, sun visors, and the like. The purpose for smooth curved surface 72 is to provide a common base surface between the individual teeth of multiple tooth first and second wings 52, 53. If a panel thickness "G" results in contact between the first or second leg members 16, 20 and the second panel surface 108 in between any of the teeth, contact will be made with smooth curved surface 72, providing frictional contact to resist removal of fastener 10 until contact with the positive engagement surface 78 is made.

As further shown in FIG. 12 and with continuing reference to FIGS. 1 and 2, the individual eyelets, including first, second, third, fourth eyelets 28, 30, 32, 34 (only first and second eyelets 28, 30 are visible in this view), elastically deform to position each of the eyelets 28, 30, 32, 34 substantially parallel with respect to first panel surface 106 in the installed position of fastener 10. It is also possible that planar body panel 14 can be raised with respect to first panel surface 106 if the individual eyelets 28, 30, 32, 34 do not completely deflect during installation of fastener 10. Another purpose of the individual eyelets 28, 30, 32, 34 is to broaden the footprint, or surface area, of planar body panel 14 of fastener 10 which is in direct contact with first panel surface 106. It is also possible that planar body panel 14 can be raised with respect to first panel surface 106 by contact between the first and second bite members 24, 26 and first panel surface 106 when first and second bite members 24, 26 are present. First and second bite members 24, 26 when engaging the first panel surface 106 act to prevent rotation of fastener 10 when shank 104 is rotatably received in single helix aperture 22.

According to additional embodiments, not shown, single helix aperture 22 can be replaced by a double helix aperture, and first and second bite members 24, 26 can be increased in quantity or omitted. In addition, the quantity of teeth of multiple tooth wings (52, 52', 53, 53') can be varied between one, two, or three, by either eliminating individual ones of first tooth 56, second tooth 58, and/or third tooth 60, or increased to more than four teeth. Further, the material of fastener 10 can also be a polymeric material in place of metal, and fastener 10 can be made using a molding operation and molding die, however, the maximum resistance to release of 1,780 newton meters may not be achieved with a polymeric material.

With continuing reference to FIGS. 1-12, according to several aspects, retention fastener 10 includes body panel 14 having first and second leg members 16, 20 integrally connected to the body panel 14 and both co-extending with respect to the first panel surface 106 of the body panel 14. Each of the first and second leg members includes at least one retention feature 46, 48, including single tooth wing (50, 51) having smooth curved surface 72 extending to a single wing retention tooth (64, 66). Multiple tooth wing (52, 53) is positioned beside the single tooth wing (50, 51), with the multiple tooth wing (52, 53) having multiple individual teeth (56, 58, 60, 62) arranged on curved surface 91. The multiple tooth wing (52, 53) is oriented in a superimposed position (as shown in FIGS. 5 and 12) with respect to the single tooth wing (50, 51) such that the individual teeth (56, 58, 60, 62) extend outwardly with respect to the smooth curved surface 72 of the single tooth wing (50, 51). The individual teeth (56, 58, 60, 62) of the at least one retention feature 46, 48 of the first leg member 16 are oppositely directed with respect to the individual teeth (56', 58', 60', 62') of the at least one retention feature 46', 48' of the second leg member 20.

With further reference to FIGS. 1 through 12, a retention fastener system 105 includes panel 100 having aperture 102 created therethrough. The panel 100 has opposed first and second panel surfaces 106, 108. Fastener 10 is adapted to partially extend through the aperture 102 of the panel 100. The fastener 10 includes body panel 14 which contacts the first panel surface 106 in a fastener installed position. First and second leg members 16, 20 of fastener 10 are integrally connected to the body panel 14 by first leg member portions 40, 40' and both co-extend with respect to first panel face 38 of body panel 14, and have a second leg member portion 42, 42' directed back toward the body panel 14. Each of the first and second leg members 16, 20 includes at least one retention feature 46, 48 (46', 48') connected to the second leg member portion 40 or 40'.

The at least one retention feature 46, 48 (46', 48') includes single tooth wing 50, 51 (50', 51') having smooth curved surface 72, 72' extending to single wing retention tooth 64, 66 (64', 66') and multiple tooth wing 52, 53 (52', 53') positioned beside the single tooth wing 50, 51 (50', 51'). The multiple tooth wing 52, 53 (52', 53') has multiple individual teeth 56, 58, 60, 62 (56', 58', 60', 62') arranged on curved surface 91, 91' that sequentially increase in height with respect to the curved surface 91, 91'. The multiple tooth wing 52, 53 (52', 53') is oriented in a superimposed position with respect to the single tooth wing 50, 51 (50', 51') such that the individual teeth 56, 58, 60, 62 (56', 58', 60', 62') extend outwardly with respect to the smooth curved surface 72, 72' of the single tooth wing 50, 51 (50', 51'). The first and second leg members 16, 20 extend through the aperture 102 in the fastener installed position (shown in FIG. 12) and have an individual one 56, 58, 60, or 62 (56', 58', 60', or 62') of the individual teeth 56, 58, 60, 62 (56', 58', 60', 62') of the multiple tooth wing 52, 53 (52', 53') and the smooth curved surface 72, 72' of the single tooth wing 50, 51 (50', 51') of both the first and second leg members 16, 20 contacting the second panel surface 108.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A retention fastener, comprising:
   a body panel;
   first and second leg members integrally connected to the body panel and both co-extending with respect to a first panel face of the body panel, each of the first and second leg members including:
   at least one retention feature, including:
   a single tooth wing having a smooth first curved surface extending to a single wing retention tooth, and
   a multiple tooth wing positioned beside the single tooth wing, the multiple tooth wing having multiple individual teeth arranged on a second curved surface, the second curved surface of the multiple tooth wing in a superimposed position with respect to the first curved surface of the single tooth wing such that a height of the individual teeth all extend further outward and away with respect to the smooth first curved surface of the single tooth wing.

2. The retention fastener of claim 1, further including multiple eyelets integrally connected to and outwardly extending from a first or a second outer edge of the body panel, each of the eyelets having an eyelet aperture sized to determine a flange segment width of the eyelets and thereby to predetermine a resistance to bending of each eyelet.

3. The retention fastener of claim 2, wherein each of the eyelets is oriented at an angle ranging between approximately 5 degrees to approximately 15 degrees with respect to the body panel.

4. The retention fastener of claim 1, wherein the first and second leg members define mirror images of each other.

5. The retention fastener of claim 1, wherein the single tooth wing is integrally connected to the multiple tooth wing by a curved wing connecting member.

6. The retention fastener of claim 1, wherein the multiple individual teeth of the multiple tooth wing sequentially increase in height with respect to the first curved surface in the superimposed position of the first and second curved surfaces to permit a maximum rotation of the first and second leg members about an arc of rotation.

7. The retention fastener of claim 1, wherein the single tooth wing includes a wing retention tooth having a positive engagement surface oriented substantially parallel to the body panel in a non-deflected condition of the first and second leg members.

8. The retention fastener of claim 1, further including a helix aperture created in the body panel adapted to receive a threaded fastener, and the first and second leg members each include an opening providing clearance for receipt of the threaded fastener such that the threaded fastener does not contact either of the first or second leg members when received through the helix aperture.

9. The retention fastener of claim 1, wherein the at least one retention feature includes first and second retention features defining mirror images of each other.

10. The retention fastener of claim 1, wherein the single tooth wing is oriented at an angle with respect to the multiple tooth wing, the angle ranging from zero to approximately 20 degrees.

11. A retention fastener, comprising:
    a body panel;
    first and second leg members integrally connected to the body panel by first leg member portions and both co-extending with respect to a first panel face of the body panel and having a second leg member portion directed back toward the body panel, each of the first and second leg members including:
    at least one retention feature connected to the second leg member portion, including:
    a single tooth wing having a smooth first curved surface having a radius of curvature extending to a single wing retention tooth, and
    a multiple tooth wing positioned beside the single tooth wing, the multiple tooth wing having multiple individual teeth arranged on a second curved surface having a radius of curvature equal to the radius of curvature of the first curved surface, the individual teeth sequentially increasing in height with respect to the second curved surface, the multiple tooth wing being oriented in a superimposed position with respect to the single tooth wing such that the height of the individual teeth extend further outward and away with respect to the smooth first curved surface of the single tooth wing.

12. The retention fastener of claim 11, further including multiple eyelets integrally connected to and outwardly extending from the body panel, the body panel defining a planar shape, each of the eyelets having an eyelet aperture sized to determine a flange segment width of the eyelets and thereby to predetermine a resistance to bending of each eyelet.

13. The retention fastener of claim 2, wherein each of the eyelets is oriented at an angle ranging between approximately 5 degrees to approximately 20 degrees with respect to the planar shaped body panel.

14. The retention fastener of claim 11, further including a third leg member portion defining a U-shape integrally connecting the first leg member portion to the second leg member portion, free ends of the second leg member portion directed toward the body panel and elastically deflected toward each other by bending of the third leg member portion during installation of the retention fastener into an aperture created in a panel.

15. The retention fastener of claim 11, wherein the individual teeth of the at least one retention feature of the first leg member are oppositely directed with respect to the individual teeth of the at least one retention feature of the second leg member.

16. A retention fastener system, comprising:
a panel having an aperture created therethrough, the panel having opposed first and second panel surfaces;
a fastener adapted to partially extend through the aperture of the panel, the fastener including:
a body panel contacting the first panel surface in a fastener installed position;
first and second leg members integrally connected to the body panel by first leg member portions and both co-extending with respect to a first panel face of the body panel and having a second leg member portion directed back toward the body panel, each of the first and second leg members including:
at least one retention feature connected to the second leg member portion, including:
a single tooth wing having a smooth first curved surface extending to a single wing retention tooth, and
a multiple tooth wing positioned beside the single tooth wing, the multiple tooth wing having multiple individual teeth arranged on a second curved surface sequentially increasing in height with respect to the first curved surface, the multiple tooth wing second curved surface being in a superimposed position with respect to the single tooth wing first curved surface such that the height of all of the individual teeth extend further outward and away with respect to the smooth first curved surface of the single tooth wing;
the first and second leg members extending through the aperture in the fastener installed position and having an individual one of the individual teeth of the multiple tooth wing and the smooth curved surface of the single tooth wing of both the first and second leg members contacting the second panel surface.

17. The retention fastener system of claim 16, further including multiple eyelets integrally connected to and outwardly extending from the body panel and contacting the first panel surface in the fastener installed position.

18. The retention fastener of claim 17, wherein:
each of the eyelets has an eyelet aperture sized to determine a flange segment width of the eyelets and thereby to predetermine a resistance to bending of each eyelet; and
each of the eyelets is oriented at an angle ranging between approximately 5 degrees to approximately 15 degrees with respect to the body panel.

19. The retention fastener system of claim 16, wherein a first tooth of the individual teeth contacts the second panel surface for a panel having a minimum thickness.

20. The retention fastener system of claim 16, wherein a fourth tooth of the individual teeth contacts the second panel surface for a panel having a maximum thickness.

21. The retention fastener system of claim 16, further including:
a threaded fastener received through a single helix aperture created in the body panel; and
a device connected to the panel using the threaded fastener having the device contacting the first panel surface.

22. The retention fastener of claim 1:
wherein the first curved surface has a radius of curvature; and
the second curved surface has a radius of curvature equal to the radius of curvature of the first curved surface.

* * * * *